United States Patent [19]

de La Chapelle et al.

[11] Patent Number: 4,832,433
[45] Date of Patent: May 23, 1989

[54] FIBER-OPTIC FEED NETWORK USING SERIES/PARALLEL CONNECTED LIGHT EMITTING OPTO-ELECTRONIC COMPONENTS

[75] Inventors: Michael de La Chapelle; Hui-Pin Hsu, both of Canoga Park; Gib F. Lewis, Manhattan Beach; John E. Mantele, Laguna Niguel, all of Calif.

[73] Assignee: Hughes Aircraft Company, Los Angeles, Calif.

[21] Appl. No.: 948,339

[22] Filed: Dec. 31, 1986

[51] Int. Cl.$^4$ .............................................. G02B 6/42
[52] U.S. Cl. ................................ 350/96.15; 342/371; 350/96.10; 350/96.16; 455/610; 455/612
[58] Field of Search ............... 342/371; 455/612, 610, 455/613, 618; 350/96.10, 96.13, 96.14, 96.15, 96.16, 96.24

[56] References Cited

U.S. PATENT DOCUMENTS

| 4,128,759 | 12/1978 | Hunt et al. ............... 350/96.13 X |
| 4,546,249 | 10/1985 | Whitehouse et al. ........... 455/610 X |

FOREIGN PATENT DOCUMENTS

| 0006650 | 1/1980 | European Pat. Off. |
| 0010682 | 5/1980 | European Pat. Off. |
| 2583942 | 12/1986 | France |
| 219923 | 3/1985 | German Democratic Rep. .................... 455/612 |
| 57-152739 | 9/1982 | Japan .................................. 455/612 |
| 59-204329 | 11/1984 | Japan .................................. 455/612 |
| 2165712 | 4/1986 | United Kingdom . |

OTHER PUBLICATIONS

IEEE Communications Magazine, vol. 19, No. 5, Sep. 5, 1981, IEEE, New York, U.S.A., D. Casasent: "A Review of Optical Signal Processing," see pp. 40-48, section Optical Signal Processing for Adaptive Phased Array Radar; FIG. 10.

*Primary Examiner*—John D. Lee
*Attorney, Agent, or Firm*—R. A. Hays; A. W. Karambelas

[57] ABSTRACT

The corporate feed network employs light emitting opto-electronic components, such as laser diodes (12), connected together in a string (14) for distributing RF, microwave, MMW, digital signals, and pulse modulated light. Each diode provides two ports or facets which are coupled to optical fibers (16, 18) to connect to an active phased array antenna, for example. The diodes are selected in number and impedance to provide a good wideband impedance match to the RF/microwave/MMW/digital driving source. Multiple series strings of diodes may be employed, connected in parallel for larger corporate feed structures.

23 Claims, 7 Drawing Sheets

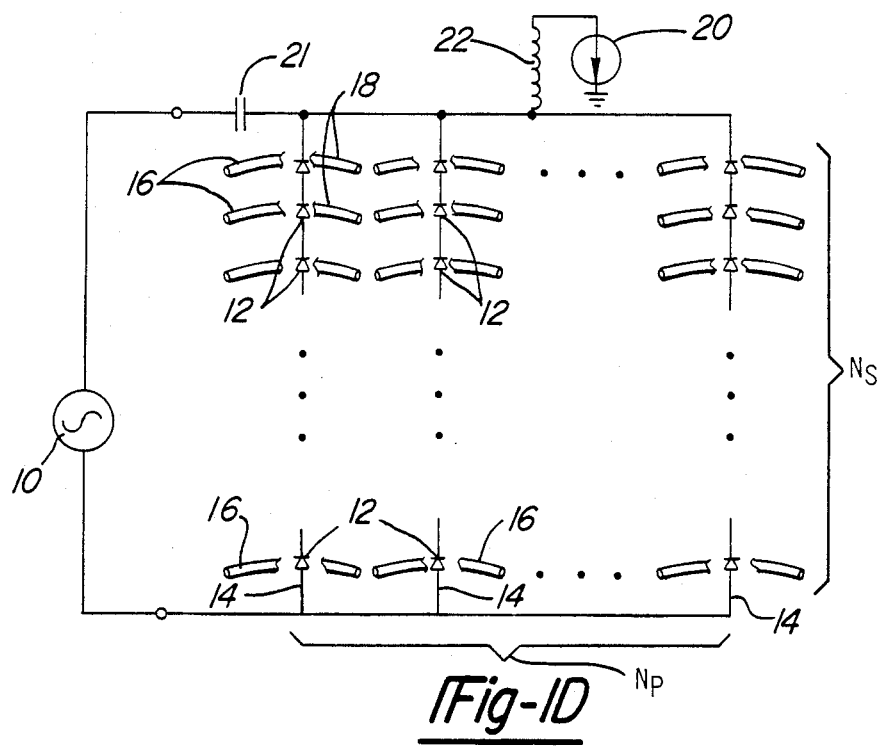
*Fig-1D*
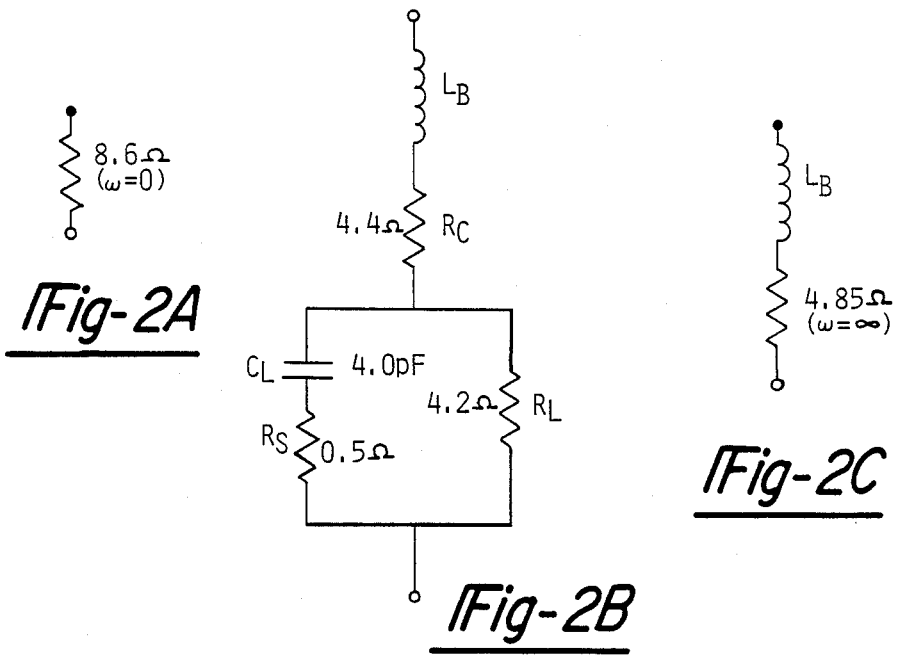
*Fig-2A*
*Fig-2B*
*Fig-2C*

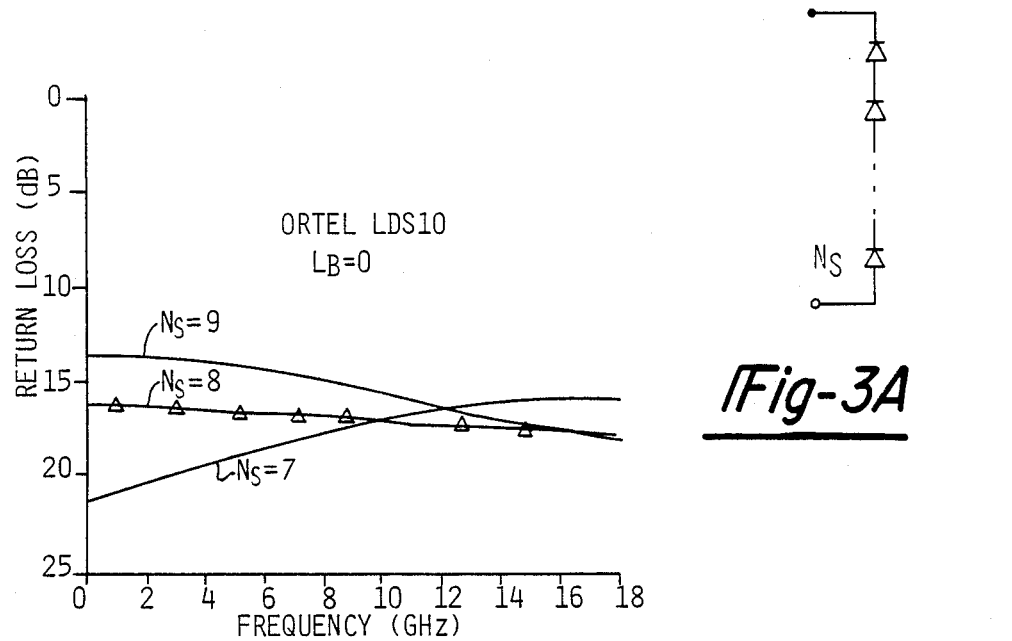
*Fig-3A*
*Fig-3B*
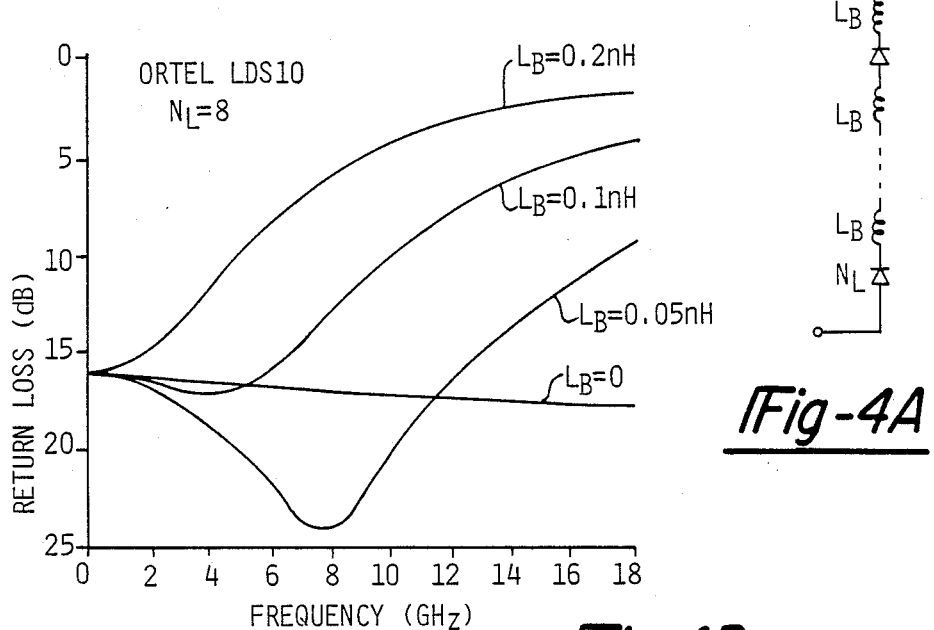
*Fig-4A*
*Fig-4B*

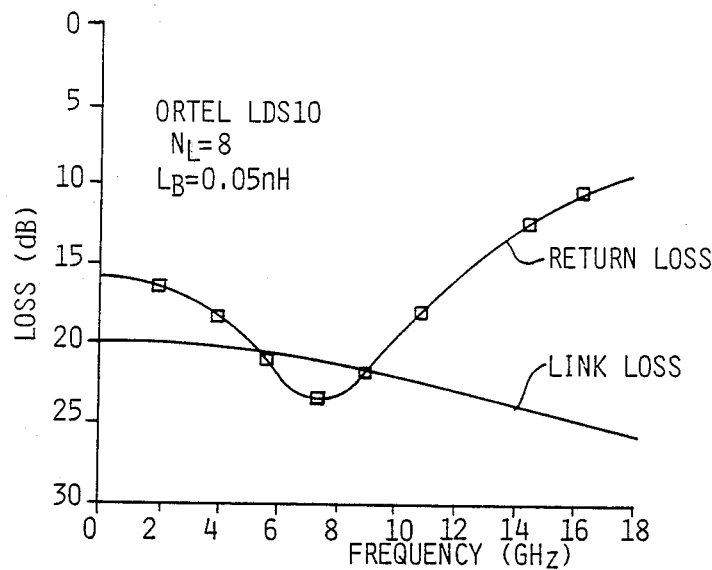
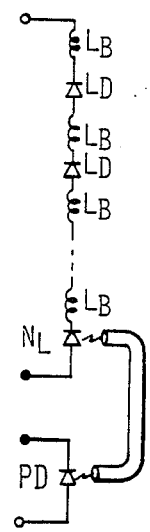
Fig-5B
Fig-5A
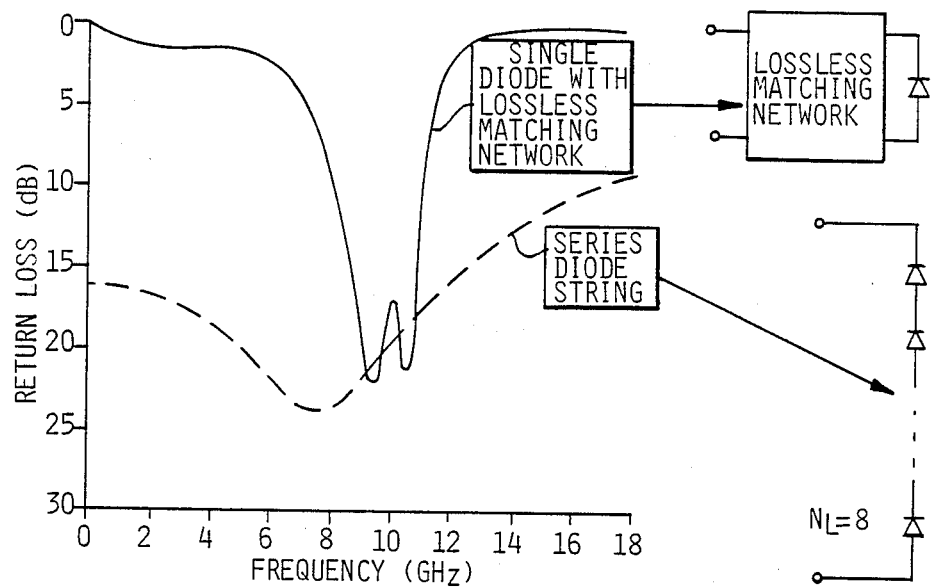
Fig-6B
Fig-6A

FIBER-OPTIC FEED NETWORK USING SERIES/PARALLEL CONNECTED LIGHT EMITTING OPTO-ELECTRONIC COMPONENTS

BACKGROUND OF THE INVENTION

1. Field of the Invention

The present invention relates generally to fiber-optic corporate feeds and more particularly to a corporate feed network for phased array antennas using laser diodes.

2. Description of Related Art

Corporate feed networks for RF/microwave MMW signals are conventionally realized using waveguide or microstrip. Such distribution networks are heavy and bulky, which is undesirable, especially for corporate feed networks for phased array antennas in airborne radar applications. Fiber optic technology affords a significant bulk and weight savings.

Fiber-optic technology using laser diodes is quite desirable in providing corporate networks for phased array antennas, since the hair-like fibers can handle a very wide bandwidth. However, there are drawbacks to the two conventional methods of realizing fiber-optic distribution networks shown in FIGS. 10 and 11. In FIG. 10, the RF power from the exciter is split into many channels by a RF power divider (such as a Wilkinson power divider). Each channel should be individually impedance matched to the laser diode impedance. The drawbacks to this method are that RF power dividers and impedance matching networks are:

(a) power inefficient due to required wide band impedance match and Wilkinson divider;
(b) heavy and bulky; and
(c) bandwidth limiting.

The RF exciting source must have high power to overcome the inefficiencies of the scheme. The bandwidth of known available Wilkinson power dividers is less than that of the proposed invention.

In FIG. 11, the optical signal is divided into many channels as opposed to the scheme of FIG. 10 which divides the RF power. Since the method of FIG. 11 involves the division of the optical signal, a very high power optical source is required. High power solid-state laser diodes with microwave frequency response are not currently available. Also, this system is inefficient for broad band operation where resistive impedance matching to the laser diode is required and because the RF splitting loss to each feed increases in a squared relationship.

Stacked array laser diodes have been constructed of monolithically connected series laser diodes using a multiheterostructure. Such stacked arrays are used for increasing the optical pulsed power by summing the contributions from each device. Conventional stacked arrays can only be operated at very low duty cycles, on the order of less than 1%, because of the thermal problems associated with poor heat sinking to all but the bottom laser diode in the array. The average power generated by such stacked array diodes is thus quite low. Furthermore, the conventional stacked array is not generally useful, nor have they ever been used or considered for use, in corporate feed networks, since the array does not distribute the signal to a plurality of optical fibers connecting to for example, antenna array elements and is generally not matched to the RF impedance of the transmitter circuit.

Hence, despite the advances made in fiber optic technology and laser diode technology, there has heretofore been no means for realizing a corporate feed opto-electronic network for distributing optical energy to microwave devices such as phased array antennas that takes advantage of the wide bandwidth and light weight/volume of fiber-optic components.

SUMMARY OF THE INVENTION

The present invention combines laser diode and fiber-optic technology into a corporate feed network. The invention overcomes the bulk and weight problems associated with conventional waveguide and microstrip distribution networks. At the same time, the invention provides a very wide transmission bandwidth, on the order of 0–12 GHz for phased array antenna applications. Both analog and digital signals can be carried on the same fiber.

In accordance with the invention, a plurality of laser diodes are connected in series, with each diode providing two individual optical ports for coupling to two optical fibers. The forward biased laser diodes have low resistance (typically 3 ohms) so several laser diodes are connected in series to achieve a match to the impedance of the driving source (typically 50 ohms). In addition, the input capacitance to the laser array is reduced by series connection of the laser diodes, allowing very wide bandwidth operation. The input VSWR into the laser diode distribution array is advantageously low over the entire transmission band without the use of impedance matching circuits. In order to feed large antenna arrays, a plurality of strings of series connected lasers are connected in parallel. In this fashion the number of optical ports is greatly increased while the RF impedance remains properly matched.

Preferably, each laser diode or laser chip is individually heat sunk, which avoids thermal problems associated with conventional monolithically stacked arrays. The invention is thus able to operate in an optical, continuous wave (CW) fashion instead of pulsed at a low duty cycle as is the conventional practice for generating high power pulses.

In general, the number of elements that can be fed by the invention is $2N_p^2 N_L$ where $N_p$ is the number of parallel branches of series connected lasers and where $N_L$ is the optimum number of laser diodes connected in a single series string. The laser diode chips can be fabricated in miniature (on the order of 0.010 inches across). The diodes may be placed physically close to each other and the resulting distribution network is thus advantageously small, and due to the use of identical elements, readily susceptible to mass fabrication. Due to all of these aforementioned advantages, the invention may be employed in sophisticated RF distribution systems, such as radar, which use active phased array transmitters.

For a more complete understanding of the invention, its objects and its advantages, reference may be had to the following specification and to the accompanying drawings.

BRIEF DESCRIPTIONS OF THE DRAWINGS

In the accompanying drawings:

FIG. 1D is a generalized drawing illustrating the invention consisting of $N_p$ parallel branches with $N_S$ series connected laser diodes in each branch. Optical energy is coupled into two optical fibers from the front and back facets of each laser;

FIG. 2A is a schematic diagram illustrating the equivalent circuit of a laser diode at DC ($\omega=0$);

FIG. 2B is a schematic diagram of an equivalent RF circuit model of a laser diode usable in practicing the invention;

FIG. 2C is a schematic diagram illustrating an equivalent circuit model of a laser diode in the high frequency limit ($\omega=\infty$);

FIG. 3A is schematic diagram illustrating a circuit configuration according to the invention with $N_s$ series connected lasers in one parallel branch ($N_p=1$).

FIG. 3B is a graph depicting return loss versus frequency for the circuit configuration of FIG. 3A, for $N_S=7, 8, 9$ and $N_p=1$ with the bond wire inductance, $L_B$, set to zero; $N_S=8$ giving the flattest response;

FIG. 4A is a schematic diagram illustrating a circuit configuration according to the invention, which is the same as FIG. 3A with bond wire inductance added;

FIG. 4B is a graph depicting return loss versus frequency for the circuit configuration of FIG. 4A, for $N_S=8$ and $N_p=1$ showing the effect of the bond wire inductance, $L_B$;

FIG. 5A is a schematic diagram illustrating a circuit configuration according to the invention;

FIG. 5B is a graph depicting return loss and link loss versus frequency for the circuit configuration of FIG. 5A, for $N_L=8$, $N_p=1$, and $L_B=0.05$ nH, with the photodiode detector assumed to have a flat response over frequency;

FIG. 6A is a schematic diagram of a single diode matched with a matching circuit and a schematic diagram illustrating a circuit configuration according to the invention;

FIG. 6B is a graph depicting a comparison of the return loss versus frequency response for a single diode matched to 50 ohms with a lossless matching circuit and the response of 8 laser diodes in series illustrated in FIG. 6A; the 8 diode series array giving a higher return loss over a wider frequency band;

DESCRIPTIONS OF THE PREFERRED EMBODIMENTS

Figure 1A:
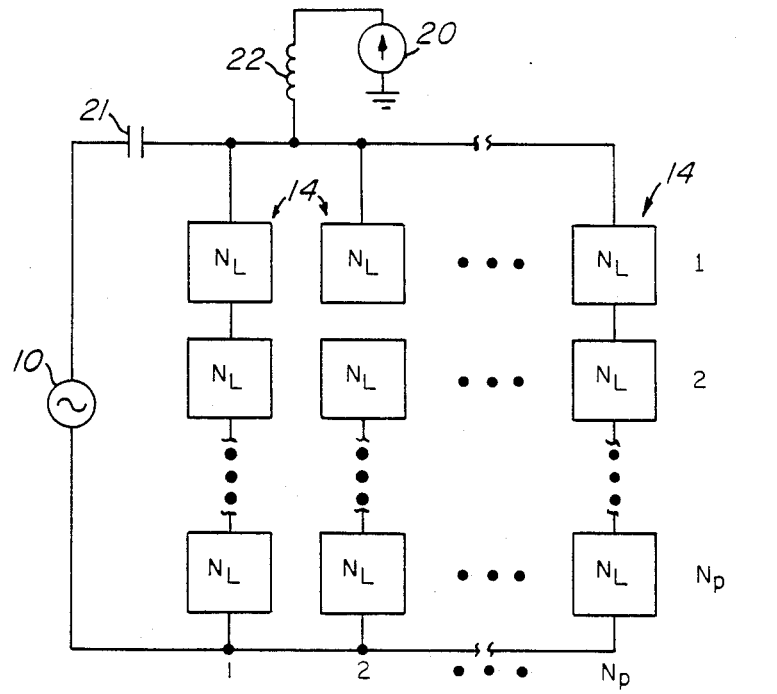
FIG. 1A is a generalized drawing illustrating the invention consisting of $N_p$ parallel branches with $N_p$ series connected laser diode modules in each branch, each module having $N_L$ series connected laser diodes.
Figure 9:
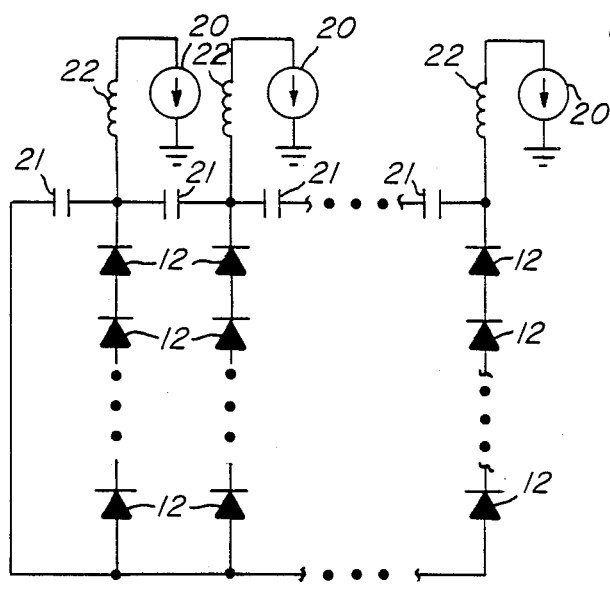
FIG. 9 illustrates the invention with separate bias sources for each parallel branch.
Figure 1B:
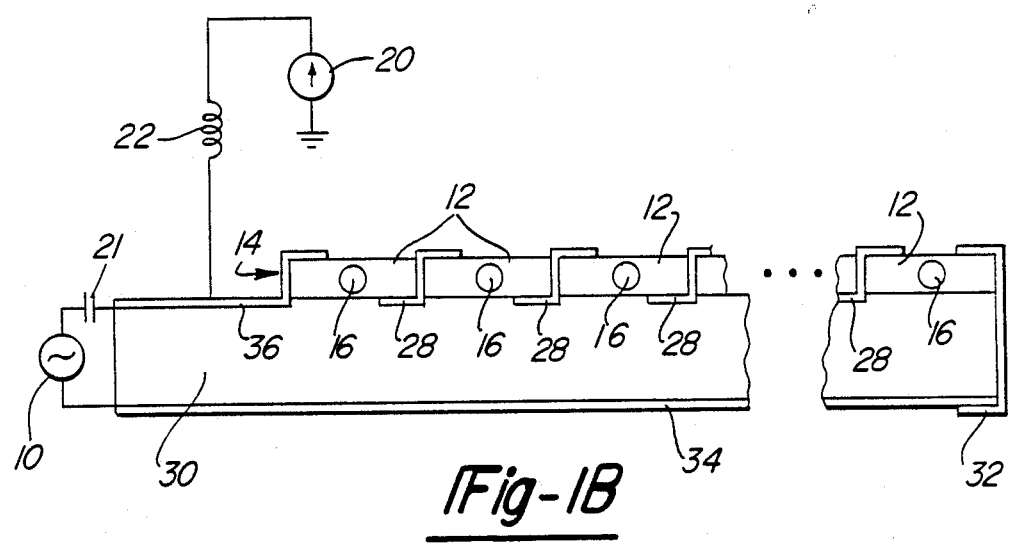
FIG. 1B is a generalized physical realization of the invention showing a single series string.
Figure 1C:
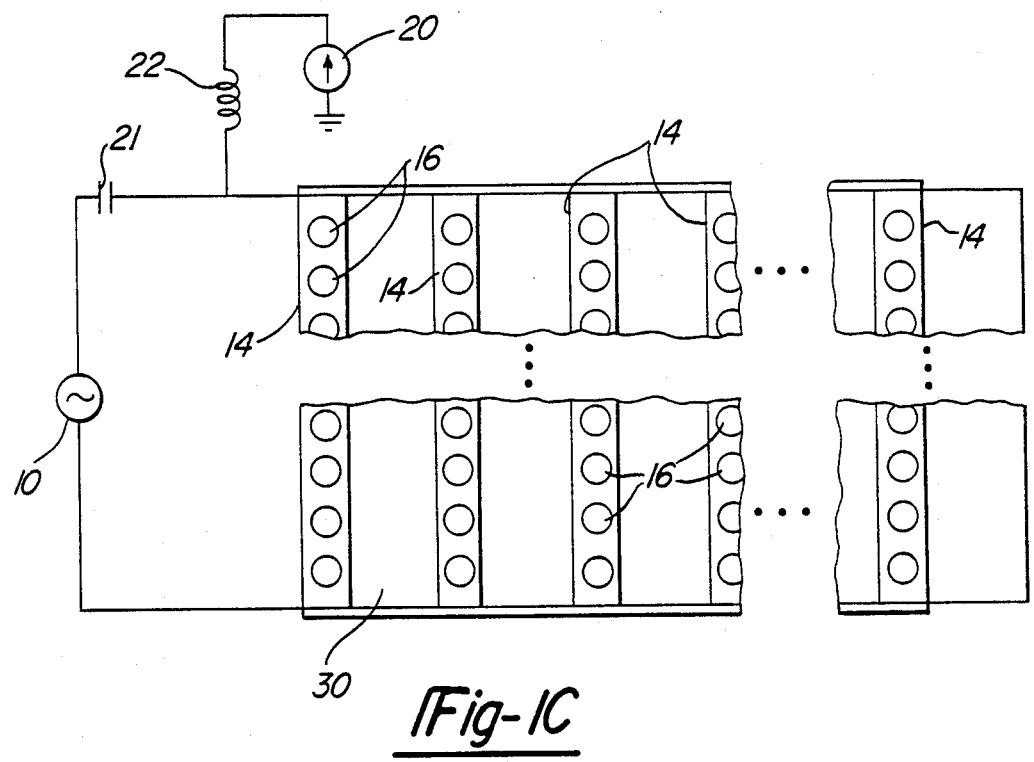
FIG. 1C is a generalized physical realization of the invention showing parallel connected strings.

The fundamentals of the invention are shown in FIGS. 1A–1D. FIGS. 1A–1D show a feed energy source, in this case an RF source 10 having a characteristic impedance typically of 50 ohms. It is understood however, that the feed energy source may also be RF microwave, millimeter wave pulsed modulated light, digital, or another energy source suitable for feeding energy to the laser diodes depending on the application. RF source 10 drives a plurality of laser diodes 12 connected together. There are $N_p$ parallel branches of series connected strings 14 of laser diodes, each series string having $N_S=N_L*N_p$ diodes. $N_L$ is the optimum number of laser diodes for one string of series connected diodes and is dependent on the particular laser diode used. $N_L$ will be determined below for a typical high frequency laser diode. FIG. 1D also shows that two optical fibers 16 and 18 are fed from each laser diode—one fiber from the front facet and the other fiber from the back facet. In FIGS. 1B and 1C only one facet is visible and hence only one fiber 16 for each diode is shown. A constant DC current source 20, isolated from the RF circuit by inductor 22, is used to bias the laser diodes. Capacitor 21 isolates the source from the DC bias. Capacitor 21 and inductor 22 may be replaced by any high pass filter and low pass filter, respectively. If all devices are alike in FIGS. 1A–1D, then each device will have the same current flowing through it. To prevent current flow imbalances from occuring due to unmatched laser diodes or random failures, individual biasing for each parallel branch may be employed, as shown in FIG. 9. The laser diodes 12 are interconnected using series interconnects 28, which may be fabricated of gold ribbon or deposited metallization if monolithically fabricated. The diodes are mounted on electrically insulating heat sink 30 which preferably has a low thermal impedance such as BeO, BeN or alumina. A ground strap 32 wraps around the last diode in string 14, connecting it to metal ground plane 34. Strap 32 may be fabricated of gold ribbon and the metal ground plane may be gold, copper or another suitable metal. Connection to the RF source 10 is made by RF connector strap 36 connected preferably as a microstrip transmission line with the system impedance as shown. With reference to FIG. 1C, the individual strings 14 are shown mounted to heat sink 30.

It should be understood that the number of individual laser diodes comprising each string 14 depends on the number of parallel branches employed. This is illustrated in FIG. 1A. Each box denoted $N_L$ contains a plurality of laser diodes (the optimum number which will be determined below). For purposes of illustration, each box denoted $N_L$ can be considered to contain eight series connected laser diodes. If the invention is to be implemented using a single series string, then one block $N_L$ is used. If two series strings are employed, then each string will contain two blocks $N_L$. In the generalized case of $N_p$ parallel branches, each string will contain the number $N_p$ of blocks $N_L$. In this fashion, the series/parallel laser diodes are properly matched to the characteristic impedance of the RF source 10.

The invention may be analyzed in the general case with the aid of a computer to demonstrate its operability and to determine the optimum number of diodes $N_L$. The analysis begins by first considering the single parallel branch ($N_p = 1$) or one series string 14. An equivalent circuit model developed from S-parameter measurements is shown in FIGS. 2A–C for a typical high-speed laser diode. The laser diodes may be implemented by using Ortel Corp. LDS10 laser diodes, for example.

Proper choice of $N_L$ begins by determining the return loss versus frequency for $N_S$ laser diodes connected in series. FIG. 3B shows the result of this analysis for $N_S = 7, 8, 9$ in the frequency range from 0 to 18 GHz. The optimum number of devices determined from this analysis is $N_S = N_L = 8$, which results in a flat return loss of about 17 dB as a function of frequency. The return loss in the high and low frequency limits may be calculated as follows:

$$\text{return loss} = -20 \log [\rho]$$

$$\text{where } \rho = (R_N - R_0)/(R_N + R_0)$$

$R_0$ is the source impedance (50 OHMS). $R_N$ is the impedance of $N_S$ lasers connected in series. As the frequency of operation approaches zero, the diode capacitance, $C_L$, appears as an open circuit. Thus, $$R_N = N_S(R_C + R_L)$$

In the high frequency limit, $C_L$ appears as short circuit. Thus, $$R_N = N_S[R_C + R_S R_L/(R_S + R_L)]$$

Using these equations, the calculated high and low frequency limits for return loss for $N_S = 8$ are 18 dB and 16 dB, respectively. This agrees with the computer analysis of FIGS. 3A and 3B. At high frequencies, the 8 lasers in series have an impedance of 38.8 ohms and at low frequencies their impedance is 68.8 ohms. Thus, $N_S = 8$ is the optimum number of series laser diodes in a single string for the Ortel LDS10 laser diode.

In practice, a finite series inductance, $L_B$ associated with a bond wire or ribbon, must be included in the analysis to account for the connection between laser diodes. FIGS. 4A and 4B show the effect of this inductance on the impedance match to 8 lasers in series. Preferably, the bond wire inductance must be less than 0.05 nH. A typical bond wire having this inductance value may be approximately 0.7 mils in diameter and 4.5 mils long. Alternatively, two 7.5 mil long bond wires in parallel may be used to realize 0.05 nH inductance. A thick ribbon conductor may be used instead. Generally, to minimize bond wire inductance of the series interconnects, the lasers should be positioned close to one another but, with sufficient spacing to allow for adequate heat dissipation.

Figure 7A:
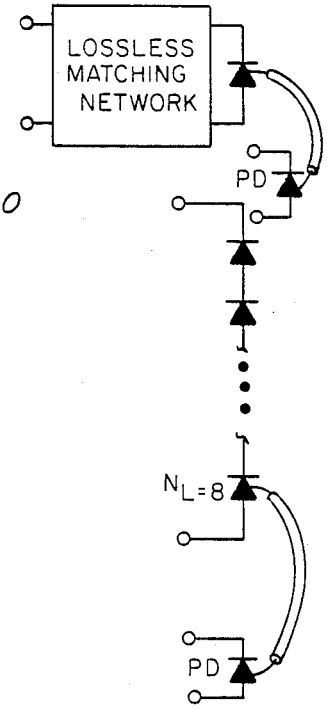
FIG. 7A is a schematic diagram of a single matched diode and a schematic diagram illustrating a circuit configuration according to the invention.
Figure 7B:
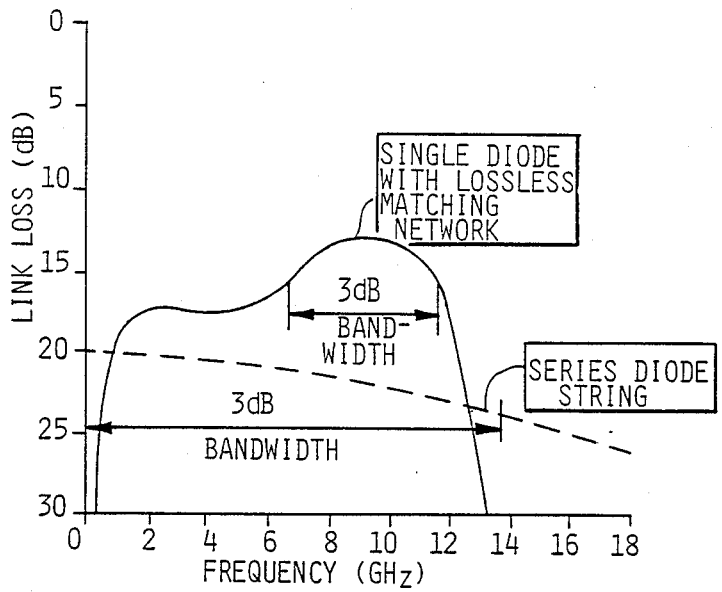
FIG. 7B is a graph comparing the transmission bandwidth of 8 laser diodes connected in series in accordance with the invention with the transmission bandwidth of a single matched diode illustrated in FIG. 7A; the 3 dB transmission bandwidth of the series array being much wider with response down to DC.
Figure 11:
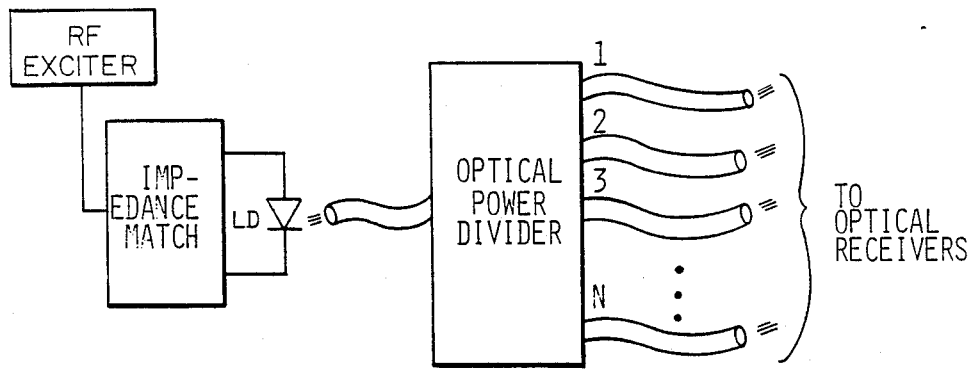
FIG. 11 illustrates another prior art fiber-optic distribution network.

In addition to the foregoing, attention should also be given to maximizing the current flow into the active resistance of the lasers, $R_L$. From the equivalent circuit of FIG. 2B, at high frequencies most of the laser current will be shunted through $C_L$ and will not generate optical energy. FIGS. 5A and 5B show the link loss and return loss for one of the 16 fiber-optic feeds in an 8 diode array. A bond wire inductance of 0.05 nH and a photodiode with flat response is assumed. The 3 dB bandwidth is about 12 GHz, which is much wider than can be achieved with lossless matching to a single diode, as is illustrated in FIGS. 7A and 7B. The link loss is lower for the single diode in FIG. 7B because the power delivered from the driving source is not split as it is with the series connected diodes. For instance, with 8 diodes connected in series, each diode will receive roughly ⅛ the available power from the driving source. Therefore, the inband link loss of the single matched diode is roughly 9 dB lower than the link loss of 8 lasers connected in series. However, in the prior art method of matching to a single laser, as shown in FIG. 11, the optical power must be split to create a corporate feed. Optical power dividing is very inefficient because the RF splitting loss to each feed is squared. The return loss and link loss for a single impedance matched laser are compared to those of 8 diodes in series in FIGS. 6A and 6B and 7A and 7B. In summary, the prior art method of FIG. 11 has much less bandwidth and a much higher insertion loss.

With identical laser diodes, there is no phase variation in the distributed signal from diode to diode in the array. If $N_S = N_L$ series connected laser give a good wideband match, then $N_S = 2N_L$ laser diodes in parallel with $N_S = 2N_L$ lasers will also give a good match. Further, three branches in parallel, each having $N_S = 3N_L$ lasers will also give a good wideband match, and so forth. The following table can then be constructed:

| # of Parallel Branches, $N_P$ | # of Series Diodes in Each Branch, $N_S = N_P N_L$ | Total # of Diodes, $N_T = N_P^2 N_L$ | Total # of Elements Fed by Scheme $N_E = 2N_P^2 N_L$ |
|---|---|---|---|
| 1 | $N_L$ | $N_L$ | $2N_L$ |
| 2 | $2N_L$ | $4N_L$ | $8N_L$ |
| 3 | $3N_L$ | $9N_L$ | $18N_L$ |
| 4 | $4N_L$ | $16N_L$ | $32N_L$ |
| . | . | . | . |
| . | . | . | . |

Figure 8B:
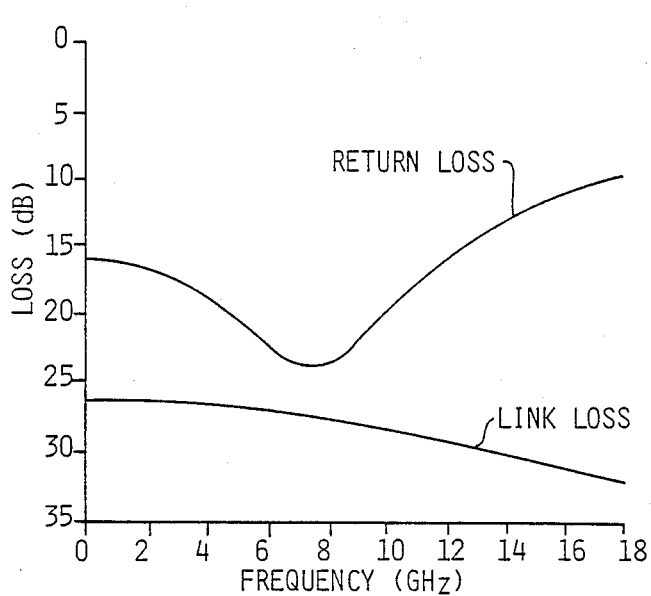
FIG. 8B is a graph depicting the response of the two parallel branches of sixteen laser diodes of FIG. 8A; the 3 dB bandwidth and the return loss are unchanged by the addition of a second parallel branch.
Figure 8A:
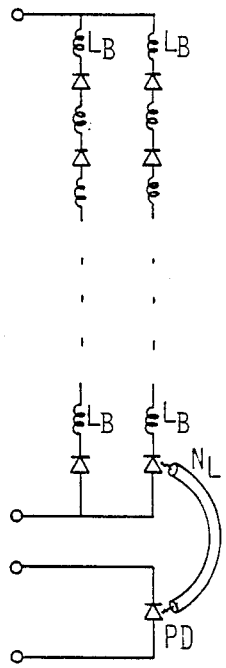
FIG. 8A is a schematic diagram illustrating two parallel branches with sixteen laser diodes in each branch.
Figure 10:
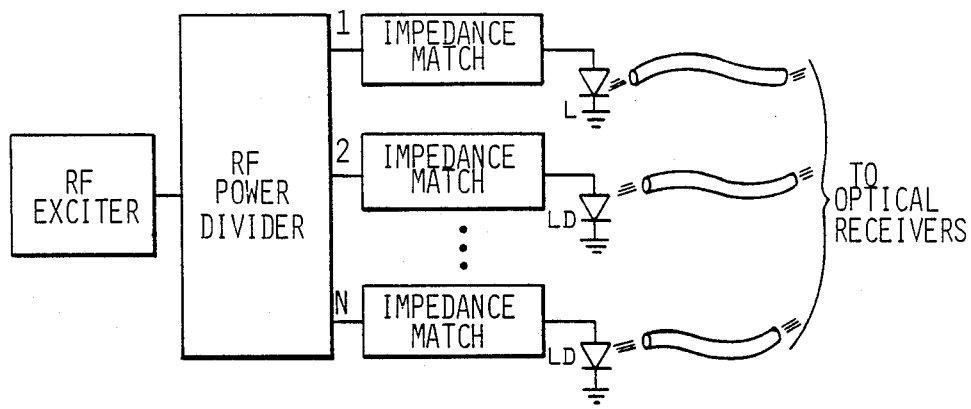
FIG. 10 illustrates a prior art fiber-optic distribution network.

The case of two parallel branches ($N_p = 2$) with 32 total diodes ($N_S = 16$ in each branch) was analyzed by computer and the results given in FIGS. 8A and 8B. The return loss versus frequency curve is nearly the same as for the eight diode case and the 3 dB bandwidth of the link loss curve also remains unchanged at 12 GHz. The link loss in the 32 diode scheme increases by 6 dB over the link loss for the eight diode scheme, because the source power is divided between more lasers.

In implementing the invention care should be taken to minimize the bond wire inductance, preferably to lower than 0.05 nH. Also, the laser diodes should be selected to have nearly the same threshold current.

The resulting corporate feed system can be used to feed large antenna arrays made up of hundreds of elements or modules. Very wide bandwidth is achievable with this scheme, which allows the distribution of high speed digital as well as microwave analog signals. The network thus permits the transmission of digital control signals to set phase shifters or attenuators in each active array module in addition to distributing the microwave transmit signals. For a general description of active element phased-array airborne radar systems see *Radar Technology* by Eli Brookner, Chapter 20, pp. 275–287.

Typically, corporate feeds require close control of phase and amplitude over the multiple signal paths implemented in the feed structure. To achieve this with the series laser configuration, close control of the optical energy launched onto each fiber will be necessary. Areas needing control include matching laser performance characterisitcs. This might be accomplished by selecting devices from the same production lot, manufacture of series connected lasers monolithically, or perhaps invoking strict and reproducible manufacturing techniques.

While the invention has been described in connection with its presently preferred embodiments, it will be understood that the invention is capable of certain modification and change without departing from the spirit of the invention as set forth in the appended claims.

What is claimed is:

1. A fiber-optic feed network comprising:
   means for supplying RF feed energy;
   a first string of series connected light emitting optoelectronic components, said string having a preselected number of said optoelectronic components therein, said string being coupled to said means for supplying RF feed energy, said means for supplying RF feed energy having a characteristic impedance substantially matched by said optoelectronic components in said first string such that RF feed energy supplied by said means for supplying RF feed energy is efficiently converted to optical energy; and
   a plurality of fiber-optic cables, each of said optoelectronic components in said first string having at least one of said cables coupled thereto such that said fiber-optic cables provide a feed network for distributing said optical energy.

2. The feed network of claim 1, wherein said feed energy is continuous wave energy.

3. The feed network of claim 1, wherein said feed energy is pulsed energy.

4. The feed network of claim 1, wherein said optoelectronic components comprise series connected laser diodes.

5. The feed network of claim 4, further comprising a DC current source for biasing said diodes, said DC current source having means for isolating itself from said feed energy means.

6. The feed network of claim 4, wherein each diode is optically coupled to two fiber-optic cables.

7. The feed network of claim 4 wherein each diode has two optical energy emitting facets with each of said facets being optically coupled to one of said fiber-optic cables.

8. The feed network of claim 1 further comprising:
   a plurality of other strings of series connected optoelectronic components, each said other string coupled in parallel with said first string, and each of said other optoelectronic components having at least one of said cables coupled thereto.

9. The feed network of claim 8, wherein each said string has an equal number of series connected laser diodes.

10. The feed network of claim 9 wherein said strings comprise two parallel strings of sixteen series connected laser diodes.

11. The feed network of claim 1, wherein each said optoelectronic components consumes substantially the same power.

12. The feed network of claim 1, wherein each of said optoelectronic components is connected to a substrate for heat dissipation.

13. A method of distributing optical signals to optical receiving elements using a network of fiber-optic components comprising:
   (a) interconnecting a plurality of light emitting optoelectronic components, said components selectively coupled to optical fibers to form an optical network;
   (b) feeding said network from an RF energy source having a characteristic impedance, the impedance of said network substantially matching the impedance of said RF energy;
   (c) distributing optical output signals to said receiving elements from said optical fibers.

14. The method according to claim 13 wherein the network comprises a string of substantially identical series connected light emitting optoelectronic components, $N_L$ in number, $N_L$ being chosen to substantially match the network impedance to the RF energy source impedance over a desired bandwidth.

15. The method of claim 13 wherein the network further comprises a plurality, Np, of parallel strings of components.

16. The method of claim 15 wherein each of said $N_p$ parallel strings has an equal number of components.

17. The method of claim 15 wherein each of said $N_p$ strings has $N_p \times N_L$ components.

18. The method of claim 13 wherein said components are laser diodes or light emitting diodes (LEDs).

19. A method of distributing RF energy to an array antenna comprising the steps of:
   supplying RF feed energy to at least one string of series connected laser diodes, each diode converting said RF feed energy into optical energy;
   providing said optical energy from at least one optical facet of each said diode;
   conveying said optical energy through a plurality of fiber-optic cables, each cable being coupled to one of said optical facets; and
   distributing, by use of said fiber-optic cables, said optical energy to individual ports of an array antenna.

20. The method of claim 19 further comprising the step of:
   varying the length of at least one of said fiber-optic cables to thereby alter the phase of the optical energy being conveyed in that cable.

21. The method of claim 19 wherein the step of supplying RF feed energy further comprises:
   supplying RF feed energy to a plurality of parallel strings of series connected laser diodes.

22. The method of claim 19 further comprising the step of:
   selecting the number of said series connected laser diodes to match the impedance of the RF feed energy source.

23. The method of claim 19 further comprising selecting the number of said series connected laser diodes to minimize the input VSWR into said series string.

* * * * *